(12) United States Patent
Brown et al.

(10) Patent No.: US 9,858,441 B2
(45) Date of Patent: Jan. 2, 2018

(54) DISABLING COUNTERFEIT CARTRIDGES

(71) Applicant: Hewlett-Packard Development Company, L.P., Houston, TX (US)

(72) Inventors: Andrew Brown, Houston, TX (US); Peter Hansen, Cypress, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 44 days.

(21) Appl. No.: 14/782,314

(22) PCT Filed: Apr. 3, 2013

(86) PCT No.: PCT/US2013/035166
§ 371 (c)(1),
(2) Date: Oct. 2, 2015

(87) PCT Pub. No.: WO2014/163638
PCT Pub. Date: Oct. 9, 2014

(65) Prior Publication Data
US 2016/0070930 A1 Mar. 10, 2016

(51) Int. Cl.
| G06F 21/00 | (2013.01) |
| G06F 21/71 | (2013.01) |
| G06F 21/44 | (2013.01) |
| G06F 21/84 | (2013.01) |
| G06F 1/28 | (2006.01) |

(52) U.S. Cl.
CPC ............... *G06F 21/71* (2013.01); *G06F 1/28* (2013.01); *G06F 21/44* (2013.01); *G06F 21/84* (2013.01); *G06F 2221/2103* (2013.01)

(58) Field of Classification Search
CPC ................ G06F 21/70–21/71; G06F 21/82
USPC .......................................................... 726/34
See application file for complete search history.

(56) References Cited

U.S. PATENT DOCUMENTS

| 7,143,279 B2 | 11/2006 | Goud et al. |
| 7,305,561 B2 | 12/2007 | Hunt et al. |
| 7,444,667 B2 | 10/2008 | Bulusu et al. |
| 7,669,235 B2 | 2/2010 | Hunt et al. |
| 7,721,096 B2 | 5/2010 | Chiasson et al. |
| 7,779,220 B1 | 8/2010 | Pione |
| 7,788,717 B2 | 8/2010 | Merkin |

(Continued)

FOREIGN PATENT DOCUMENTS

| CN | 1835478 | 9/2006 |
| CN | 101162994 | 4/2008 |

(Continued)

OTHER PUBLICATIONS

Extended European Search Report dated Oct. 18, 2016; EP Application No. 13880749.0; pp. 8.

(Continued)

*Primary Examiner* — Anthony Brown
(74) *Attorney, Agent, or Firm* — International IP Law Group, PLLC

(57) ABSTRACT

A method for disabling counterfeit cartridge operation is provided. The method includes detecting a cartridge in a blade enclosure. The method includes checking authentication credentials of the cartridge. The method includes determining the cartridge to be counterfeit. The method includes disabling the cartridge in response to determining the cartridge to be counterfeit.

11 Claims, 3 Drawing Sheets

(56) References Cited

U.S. PATENT DOCUMENTS

| | | | |
|---|---|---|---|
| 7,844,768 B2 | 11/2010 | Tanaka | |
| 7,873,846 B2 | 1/2011 | Sakthikumar et al. | |
| 8,181,032 B2 | 5/2012 | Prakash et al. | |
| 8,230,230 B2 | 7/2012 | Bondurant | |
| 8,402,262 B2 | 3/2013 | Sakthikumar et al. | |
| 2003/0016504 A1 | 1/2003 | Raynham | |
| 2004/0158838 A1* | 8/2004 | Tracey | G06F 9/5055 719/316 |
| 2007/0101442 A1 | 5/2007 | Bondurant | |
| 2007/0124413 A1 | 5/2007 | Diab et al. | |
| 2010/0217719 A1* | 8/2010 | Olsen | B26D 5/00 705/318 |
| 2011/0295908 A1 | 12/2011 | To | |
| 2012/0026667 A1 | 2/2012 | Atluri et al. | |
| 2013/0005445 A1 | 1/2013 | Walker et al. | |

FOREIGN PATENT DOCUMENTS

| | | |
|---|---|---|
| CN | 101655809 | 2/2010 |
| CN | 102195930 | 9/2011 |
| EP | 2399175 | 12/2011 |
| TW | 200817990 A | 4/2008 |
| TW | 201201019 A | 1/2012 |
| TW | 201212616 | 3/2012 |
| WO | WO-03014893 | 2/2003 |
| WO | WO-2012/108869 A1 | 8/2012 |

OTHER PUBLICATIONS

Inside Secure; "Secure Your Embedded Devices using AT90SC/SO and VaultC", Apr. 2011, 22 pps., https:/www.google.co.in/url?sa=t&rct=j&q=&esrc=s&source=web&cd=4&cad=rja&ved=0CEEQFjAD&url=http%3A%2F%2F www.insidesecure.com%2Fcontent%2Fdownload%2F1152%2F13141%2Fversion%2F1%2Ffile%2F01_Whitepaper_SecureEmbedded-Devices_0411.pdf&ei=Oog9UY_JD861rAfLrIBI&usg=AFQjCNHU9xR-OKzUQxbm9CdbRZaesJeHtA&sig2=0bxW1-iHhwHoipDmgumPgQ&bvm=bv.43287494,d.bmk>.

PCT/ISA/KR, International Search Report, dated Jan. 22, 2014, PCT/US2013/035166 ,12 pps.

* cited by examiner

DISABLING COUNTERFEIT CARTRIDGES

BACKGROUND

Networked computing systems generally include host computing devices configured to provide resources such as storage, applications, databases, and the like. The host computing device may be a server such as a database server, file server, mail server, print server, web server, or some other type of server configured to provide services to client devices within a network.

A blade server is a server computer having a modular design optimized to minimize the use of physical space. Whereas a standard rack mount server can function with a power cord and network cable, a blade server has many components removed for the purpose of saving space, minimizing power consumption and other considerations, while still having all the functional components to be considered a computer. A multi-slot blade enclosure can hold multiple blade server cartridges and provide shared resources such as power, cooling, networking, various interconnects, and management. Each cartridge can function as a computer server configured to run one or more computing services.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure provides techniques for disabling counterfeit cartridges inserted into a blade enclosure. In some embodiments, a management processor in the blade enclosure runs an authentication scheme to determine whether a cartridge in the blade enclosure is authorized or counterfeit. If the cartridge is identified as counterfeit, the management processor can disable the cartridge from interacting with any other component in the blade enclosure, making the cartridge non-operational.

Figure 1:
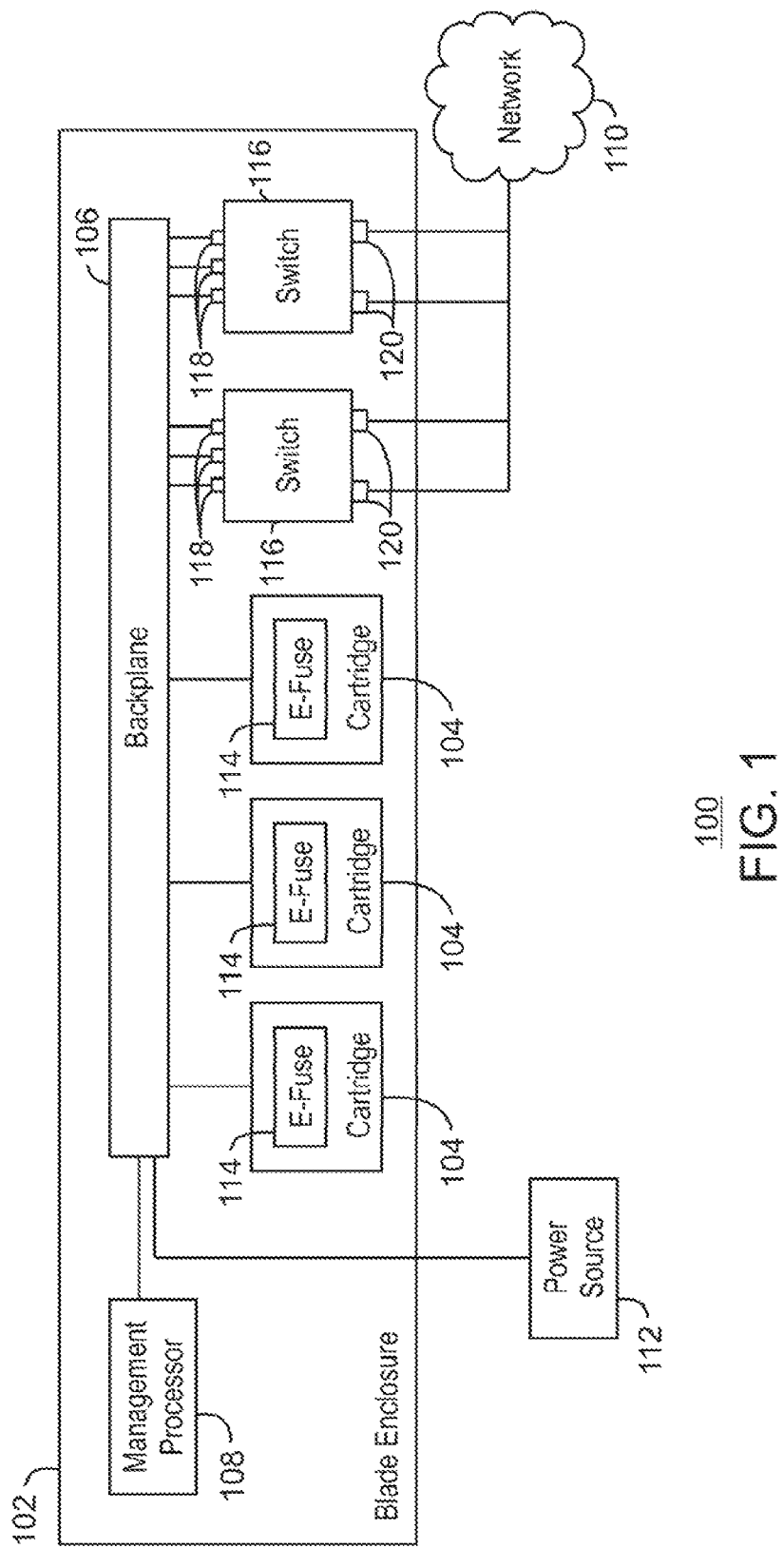
FIG. 1 is a block diagram of a computing system for disabling counterfeit cartridge operation, in accordance with embodiments.

FIG. 1 is a block diagram of a computing system for disabling counterfeit cartridge operation, in accordance with embodiments. The computing system 100 includes a number of components contained within a blade enclosure 102. A blade enclosure 102 is an enclosure for a computing system that can hold a plurality of cartridges 104 in operation. Each cartridge 104 can function as a server, a storage unit, or any other specialized computer module. Each cartridge 104 is connected to a backplane 106 via a connection port.

The backplane 106 can be a circuit board containing signal traces and connections for a number of computer components, including cartridges, drives, processors, and external devices. The backplane 106 can function as a backbone in a blade enclosure 102, providing a means of communication between the cartridges 104, a management processor 108, and an external network 110. The backplane can also route power from an external power source 112 to the cartridges 104.

The management processor 108 is a component in the blade enclosure 102 that monitors, directs, and controls various components of the computing system 100. For example, the management processor 108 can be responsible for monitoring the temperature in the blade enclosure 102, controlling a cooling system in the blade enclosure 102, managing remote logging, and sending alerts within the computing system 100. In some embodiments, the management processor 108 can detect the presence of a cartridge 104, and run an authentication algorithm to determine whether or not the cartridge 104 is authentic or counterfeit. If the cartridge 104 is determined to be counterfeit, then the management processor 108 can disable the cartridge 104. In some embodiments, the management processor 108 can disable the cartridge 104 by preventing the cartridge 104 from accepting power from the backplane 106. In some embodiments, the management processor 108 can disconnect the cartridge 104 from any external communication.

Each cartridge 104 can contain an e-fuse component 114. The e-fuse component 114 can be used to deliver a specific amount of power from the backplane to the cartridge 104. The amount of power specified by the e-fuse component 114 may be variable. In some examples, the external power source 112 can deliver 12 volts (V) to the backplane 106. The power requirement of each cartridge 104 may be substantially less (i.e., 1V, 2V, etc). Thus, the e-fuse component 114 in each cartridge 104 can accept a smaller voltage to provide the amount of power required for the cartridge 104 to operate. The e-fuse component 114 can also be capable of denying the cartridge 104 of any power from the backplane 106 in response to an instruction from the management processor 108.

The blade enclosure 102 can further contain one or more switches 116 that couple the cartridges 104 to the external network 110, which can be a wired or wireless network that includes any number of computers, storage drive bays, or any other connected electronic devices. The switches 116 can control the routing in the computing system 100. Each switch 116 may include a plurality of internal ports 118 and one or more external ports 120. The external ports 120 can communicatively couple the switch 116 to the external network, while each internal port can communicatively couple the switch 116 to a particular cartridge 104 via the backplane 106. In some embodiments, the backplane 106 includes copper traces that couple each internal port 118 on the switch to a corresponding cartridge 104. The switch 116 can forward and receive data from the cartridges 104. The switch 116 can also disable a particular internal port 118 in response to an instruction from the management processor 108, effectively cutting off the internal port's corresponding cartridge 104 from communication external to the blade enclosure 102.

Figure 2:
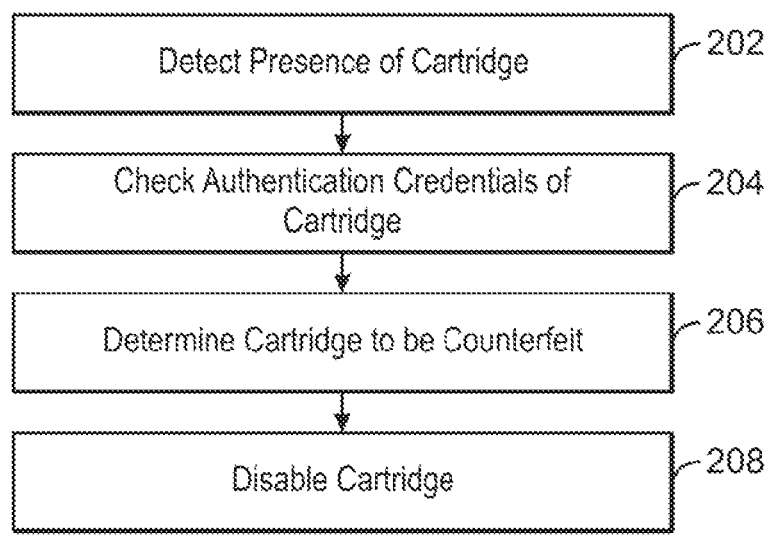
FIG. 2 is a process flow diagram of a method for disabling counterfeit cartridge operation, in accordance with embodiments.

FIG. 2 is a process flow diagram of a method for disabling counterfeit cartridge operation, in accordance with embodiments. The method 200 can be performed by a management processor in a blade enclosure containing a plurality of cartridges, a backplane, and a switch.

At block 202, the management processor detects the presence of a cartridge. When a cartridge is inserted into the blade enclosure, the cartridge will couple to the backplane, and a signal can be transmitted to the management processor to inform of the cartridge's presence. In some embodiments, the management processor can also send out an alert or notification throughout the blade enclosure, or to an external network.

At block 204, the management processor checks authentication credentials of the cartridge. The management processor can perform this after detecting the insertion of a cartridge, or intermittently during server operation. The management processor can utilize any number of challenge-response or authentication algorithms to verify the authenticity of the cartridge.

In some embodiments, the management processor requires that the cartridge provide a signature as part of an authentication scheme. The signature may be unique to the individual cartridge. In some embodiments, the signature may include two components. The first component can contain information stored in the cartridge. The second component can be a shared secret, which is a secure item of data known only by participants in an encrypted communication. The shared secret may be a password, a passphrase, a number, or an array of bytes.

At block 206, the management processor determines whether or not the cartridge is counterfeit. If the cartridge successfully passes the challenge-response or authentication algorithm set forth by the management processor, then the cartridge is authorized to function. If the cartridge does not pass the challenge-response or authentication algorithm, then the management processor identifies the cartridge as counterfeit.

In the example discussed above, the management processor can read a signature provided by the cartridge, and compare the read signature to a database of authorized signatures stored in the management processor. If the read signature matches an authorized signature, then the cartridge passes. If the read signature does not correspond to any authorized signature, or the cartridge does not provide a signature, then the cartridge is determined to be counterfeit.

At block 208, the management processor disables the cartridge in response to determining that the cartridge is counterfeit. There are a number of methods the management processor can undertake to prevent the counterfeit cartridge from operating in the blade enclosure. In some embodiments, the management processor can send an instruction to an e-fuse component in the cartridge to reject power from the backplane, thus denying the cartridge a power source. However, a possible downside to this method could be that a counterfeit cartridge manufacturer may configure the e-fuse component to ignore any instruction to reject power to the cartridge.

In some embodiments, the management processor can prevent the cartridge from communicating within the blade enclosure. The management processor can send an instruction to a switch to disable an internal port that corresponds to the counterfeit cartridge. With the internal port disabled, the counterfeit cartridge would be unable to send or receive information to an external network or to any other component in the blade enclosure.

Figure 3:
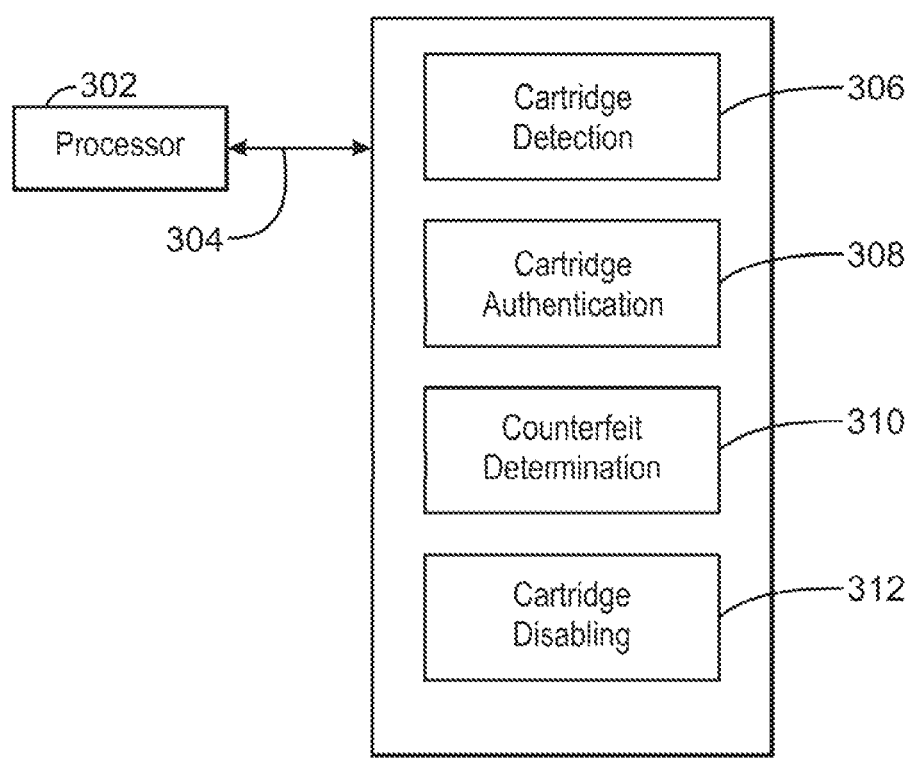
FIG. 3 is a tangible, non-transitory, computer-readable medium containing instructions for disabling cartridge operation, in accordance with embodiments.

FIG. 3 is a tangible, non-transitory computer-readable medium that stores code for disabling cartridge operation, in accordance with embodiments. The tangible, non-transitory computer-readable medium is generally referred to by the reference number 300. The tangible, non-transitory computer-readable medium 300 may correspond to any typical computer memory that stores computer-implemented instructions, such as programming code or the like. For example, the tangible, non-transitory computer-readable medium 300 may include memory devices with non-volatile memory and volatile memory. Examples of non-volatile memory include, but are not limited to, electrically erasable programmable read only memory (EEPROM), read only memory (ROM), and flash memory. Examples of volatile memory include, but are not limited to, static random access memory (SRAM), and dynamic random access memory (DRAM). Examples of memory devices include, but are not limited to, hard disk drives, compact disc drives, digital versatile disc drives, optical drives. USB drives, and flash memory devices.

The tangible, non-transitory computer-readable medium 300 can be accessed by a processor 302 over a computer bus 304. A region 306 of the tangible, non-transitory computer-readable medium may include a cartridge detection module configured to detect the presence of a cartridge in a blade enclosure. A region 308 of the tangible, non-transitory computer-readable medium may include a cartridge authentication module configured to check authentication credentials of the cartridge. A region 310 of the tangible, non-transitory computer-readable medium may include a counterfeit determination module configured to determine whether or not the cartridge is counterfeit. A region 312 of the tangible, non-transitory computer-readable medium may include a cartridge disabling module configured to disable the cartridge in the blade enclosure is response to determining that the cartridge is counterfeit.

Although shown as contiguous blocks, the software components can be stored in any order or configuration. For example, if the tangible, non-transitory computer-readable medium 300 is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing system, comprising:
an enclosure comprising a backplane;
a slot in the enclosure to receive a cartridge and connect the cartridge to the backplane;
a management processor coupled to the backplane, the management processor to check authentication credentials of the cartridge; and
a switch comprising an internal port to communicatively couple to the cartridge via the backplane, wherein the switch is to disable the internal port if the cartridge is determined to be counterfeit.

2. The system of claim 1, the backplane to couple to a power source and provide power to the cartridge.

3. The system of claim 2, the management processor to instruct an e-fuse component in the cartridge to not accept power from the backplane if the cartridge is determined to be counterfeit.

4. A method, comprising:
detecting a cartridge in a blade enclosure;
checking authentication credentials of the cartridge;
determining the cartridge to be counterfeit; and
disabling a port communicatively coupling the cartridge to the blade enclosure in response to determining the cartridge to be counterfeit.

5. The method of claim 4, comprising instructing an e-fuse component in the cartridge to not accept power.

6. The method of claim 4, comprising reading a signature in the cartridge and comparing the read signature to an authorized signature.

7. The method of claim 6, the authorized signature comprising a shared secret.

8. A tangible, non-transitory, computer-readable medium, comprising instructions for directing a processor to:
   detect a cartridge in a blade enclosure;
   check authentication credentials of the cartridge;
   determine the cartridge to be counterfeit; and
   disable a port communicatively coupling the cartridge to the blade enclosure in response to determining the cartridge to be counterfeit.

9. The tangible, non-transitory, computer-readable medium of claim 8, comprising instructions for directing a processor to instruct an e-fuse component in the cartridge to not accept power.

10. The tangible, non-transitory, computer-readable medium of claim 8, comprising instructions for directing a processor to read a signature in the cartridge and comparing the read signature to an authorized signature.

11. The tangible, non-transitory, computer-readable medium of claim 10, the authorized signature comprising a shared secret.

* * * * *